United States Patent
Kaplan et al.

(10) Patent No.: US 6,946,088 B2
(45) Date of Patent: Sep. 20, 2005

(54) THERMOSETTING COATING MASS

(75) Inventors: Andreas Kaplan, Chur (CH); Albert Reich, Trin (CH)

(73) Assignee: EMS-Chemie AG, Domat/EMS (CH)

( * ) Notice: Subject to any disclaimer, the term of this patent is extended or adjusted under 35 U.S.C. 154(b) by 328 days.

(21) Appl. No.: 10/182,695

(22) PCT Filed: Jan. 29, 2001

(86) PCT No.: PCT/EP01/00938

§ 371 (c)(1),
(2), (4) Date: Sep. 26, 2002

(87) PCT Pub. No.: WO01/57148

PCT Pub. Date: Aug. 9, 2001

(65) Prior Publication Data

US 2003/0130440 A1 Jul. 10, 2003

(30) Foreign Application Priority Data

Jan. 31, 2000 (DE) .......................... 100 04 136

(51) Int. Cl.$^7$ .............................. B29B 9/06; C08L 67/02
(52) U.S. Cl. .............................. 264/11; 264/5; 524/556; 524/560; 524/599; 524/601; 524/602; 525/418; 525/420; 525/437; 525/444; 525/448; 528/288; 528/291; 528/292; 528/296
(58) Field of Search .............................. 525/437, 444, 525/418, 420, 448; 528/288, 291, 292, 296; 264/5, 11; 524/556, 560, 599, 601, 602

(56) References Cited

U.S. PATENT DOCUMENTS

| 3,989,650 A | * | 11/1976 | Lange et al. ................... 521/32 |
| 4,305,868 A | * | 12/1981 | Wheeler et al. ............ 252/402 |
| 4,801,680 A | | 1/1989 | Geary et al. |
| 5,216,090 A | | 6/1993 | Merritt et al. |
| 5,538,759 A | * | 7/1996 | Hoppe et al. ............. 427/385.5 |
| 5,741,602 A | | 4/1998 | Hoppe et al. |
| 5,744,531 A | * | 4/1998 | Kerr et al. ................... 524/432 |
| 5,847,057 A | | 12/1998 | Kaplan et al. |

FOREIGN PATENT DOCUMENTS

| DE | 44 30 400 A1 | 2/1996 |
| DE | 197 40 206 A1 | 5/1998 |
| WO | WO 94/03545 | 2/1994 |
| WO | WO 99/16810 | 4/1999 |

OTHER PUBLICATIONS

Derwent English Abstract of DE 2751830A, Karmann et al. Aug. 1978.*
Misev, Powder Coatings Chemistry and Technology John Wiley and Sons, 1991, pp. 176–177, 216–217,227.

* cited by examiner

*Primary Examiner*—Jeffrey B. Robertson
(74) *Attorney, Agent, or Firm*—Marshall & Melhorn, LLC

(57) ABSTRACT

The invention relates to a thermosetting coating mass, comprising a carboxyl functional polyester, and/or a carboxyl functional polyacrylate, a β-hydroxyalkylamide, in which a portion of the hydroxyl groups are chemically blocked and/or fillers and/or heat stabilisers and/or triboadditives and/or further additives, such as, for example, dispersing and degassing agents.

8 Claims, No Drawings

THERMOSETTING COATING MASS

CROSS-REFERENCE TO RELATED APPLICATIONS

This application is a US National Phase application off of international application PCT/EP01/00938, filed Jan. 29, 2001.

THE BACKGROUND OF THE INVENTION

The invention relates to a thermosetting coating material which comprises a carboxyl-functional polyester or a polyacrylate and a specific selected cross-linking agent, a masked β-hydroxyalkylamide.

Powder coatings which contain carboxyl-functional polyesters and β-hydroxyalkylamides have already been known for a long time as bonding agents.

U.S. Pat. No. 4,801,680 describes powder coatings based on carboxyl-functional polyesters and β-hydroxyalkylamides, the polyester having a Tg within the range of 30° C. to 85° C. and an acid value of approximately 20 to 85 and the equivalent ratio of β-hydroxyalkylamide equivalents to carboxylic acid equivalents is within the range of 0.6 to 1.6:1.

Toxicologically safe powder coatings based on carboxyl-functional polyesters and/or carboxyl-functional polyacrylates and β-hydroxyalkylamides demonstrate very good exterior stability and are hence suitable for use outdoors. The β-hydroxyalkylamides used should contain at least two β-hydroxyalkylamide groups per molecule, i.e. be difunctional.

However, today higher-functional β-hydroxyalkylamides are used predominantly, such as for example the tetrafunctional β-hydroxyalkylamides bis[N,N'-di(β-hydroxyethyl)]-adipamide and bis N,N'-di(β-hydroxypropyl)]-adipamide.

Powder coatings which contain higher-functional (tetra or more) β-hydroxyalkylamides as hardeners still have certain disadvantages with respect to surface defects. Problems cause a partly still inadequate flow and inadequate degassing properties in the case of greater layer thickness.

U.S. Pat. No. 5,216,090 describes powder coatings based on carboxyl-functional polyesters and/or carboxyl-functional polyacrylates and mixtures of difunctional and higher-functional β-hydroxyalkylamides which clearly demonstrate improved flow control and degassing properties.

OBJECT OF THE INVENTION

It is the object of the present invention to partly mask the hydroxyl groups in β-hydroxyalkylamides in order hence to be able to control their functionality for the purpose of improving the flow control and degassing properties of powder coatings based on these modified β-hydroxyalkylamides and carboxyl-functional polyesters and/or carboxyl-functional polyacrylates.

SUMMARY OF THE INVENTION

The object is achieved by the characterising features of patent claim 1. The sub-claims show advantageous developments.

Thus it is proposed according to the invention to present a thermosetting coating material which combines a carbofunctional polyester and/or a polyacrylate and also a specifically selected β-hydroxyalkylamide as hardener. The β-hydroxyalkylamide according to the invention is thereby structured such that a part of the hydroxyl groups is chemically masked with the proviso however that at least two free OH groups are present to form the polymer in the eventual powder coating.

It is thereby preferred if the β-hydroxyalkylamide is defined by the general Formula I,

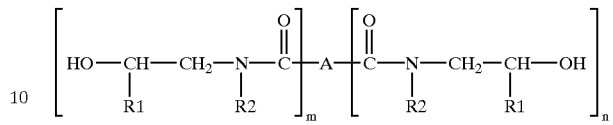

R1 being hydrogen or C1 to C5 alkyl and R2 being

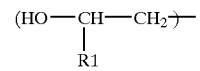

wherein R1 has the above-indicated meaning and that one or two OH groups are masked in this β-hydroxyalkylamide of the general Formula I. As masking agents, there can be considered all of the possibilities for masking hydroxyl groups which are known per se to date from prior art. It is preferred hereby if the masking is performed with an ester group. An ester grouping (Formula II) is preferred which replaces the hydrogen atom on the OH.

R3 n II is hydrogen, or a saturated or unsaturated aliphatic or cycloaliphatic or aromatic group with up to 60 C atoms, which group can contain additional carboxyl groups or a polymer, such as for example a polyester or a polyacrylate.

In the general Formula I, A is a chemical bond or a monovalent or multivalent organic group which is derived from saturated, unsaturated or aromatic hydrocarbon groups, including substituted hydrocarbon groups with 2 to 20 carbon atoms, m is 1 to 2, n is 0 to 2 and m+n is at least 2.

There are preferred:
bis[N,N'-di(β-hydroxyethyl)]-adipamide
bis[N,N'-di(β-hydroxypropyl)]-adipamide The production of β-hydroxyalkylamides according to Formula I results in the known manner by means of replacing the esters of-the corresponding dicarboxylic acid with alkanolamines during heating.

Suitable carboxyl-functional compounds for the production of β-hydroxyalkylamides of Formula I are mono-basic or polybasic aliphatic (saturated or unsaturated), cycloaliphatic (saturated or unsaturated) or aromatic carboxylic acids with up to 61 C atoms, which acids contain primary, secondary or tertiary carboxyl groups, mono-basic saturated aliphatic carboxylic acids with up to 22 C atoms being preferred. Particularly preferred is acetic acid. Also suitable are the chlorides of these carboxylic acids. Furthermore carboxyl-containing polymers are-suitable, such as the carboxyl-functional polyesters or carboxyl-functional polyacrylates which are described further on.

Suitable carboxyl-functional polyesters for the production of the powder coating can be produced according to the condensation methods according to the state of the art (esterification and/or ester interchange) which are known for polyesters. Suitable catalysts, such as for example dibutyltin oxide or titanium tetrabutylate can also if necessary be used.

Carboxyl-functional copolyesters contain as acid components mainly aromatic polybasic carboxylic acids, such as for example terephthalic acid, isophthalic acid, phthalic acid, pyromellitic acid, trimellitic acid, 3,6-dichlorophthalic acid, tetrachlorophthalic acid and as far as available their anhydride, chloride or ester. Mostly they contain at least 50% by mol terephthalic acid and/or isophthalic acid, preferably 80% by mol. The remainder of the acids (difference up to. 100% mol) comprises aliphatic and/or cycloaliphatic poly-basic acids, such as for example 1,4-cyclohexanedicarboxylic acid, tetrahydrophthalic acid, hexahydroendomethyleneterephthalic acid, hexachlorophthalic acid, azelaic acid, sebacic acid, decanedicarboxylic acid, adipinic acid, dodecanedicarboxylic acid, succinic acid, maleic acid or dimeric fatty acids. Hydroxycarboxylic acids and/or lactones, such as for example 12-hydroxystearic acid, epsiloncaprolactone or hydroxypivalic acid esters of neopentyl glycol can if necessary be used.

Monocarboxylic acids, such as for example benzoic acid, tertiarybutylbenzoic acid, hexahydrobenzoic acid and saturated aliphatic monocarboxylic acids can also be used in small quantities.

Aliphatic dioles may be mentioned as suitable alcohol components, such as for example ethylene glycol, 1,3-propanediol, 1,2-propanediol, 1,2-butanediol, 1,3-butanediol, 1,4-butanediol, 2,2-dimethylpropanediol-1,3 (neopentyl glycol), 2,5-hexanediol, 1,6-hexanediol, 2,2-[bis-(4-hydroxycyclohexyl)]propane, 1,4-dimethylolcyclohexane, diethylene glycol, dipropylene glycol and 2,2-bis-[4-(2-hdroxy)]phenylpropane. Polyols can also be used in small quantities such as for example glycerin, hexanetriol, pentaerythritol, sorbitol, trimethylolethane, trimethylolpropane and tris(2-hydroxy)isocyanurate.

Instead of dioles or polyols, epoxy compounds can also be used. Preferably, the neopentyl glycol and/or propylene glycol portion in the alcohol component amounts to at least 50% by mol relative to the entire acids.

Suitable carboxyl-functional polyacrylates for the production of the powder coatings have an acid value of 10–300 (mg KOH/g), produced by means of copolymerisation of a monomer mixture, comprising a) 0 to 70 parts by weight of methyl(meth)acrylate,
b) 0 to 60 parts by weight of (cyclo)alkyl esters of acrylic and/or methacrylic acid with 2 to 18 carbon atoms in the alkyl or in the cycloalkyl group,
c) 0 to 90 parts by weight of vinyl aromatics,
d) 1 to 60 parts by weight of olefinic unsaturated carboxylic acids, the total of the parts by weight of the components a) to d) being 100.

In the case of monomers b) there are preferably (cyclo) alkyl esters of acrylic or methacrylic acid with 2 to 18 carbon atoms in the (cyclo)alkyl group. Examples of suitable or preferably suitable monomers b) are ethyl(methyl) acrylate, n-propyl(meth)acrylate, isopropyl(meth)acrylate, n-butyl(meth)acrylate, isobutyl(meth)acrylate, tert-butyl (meth)acrylate, 2-ethylhexyl(meth)acrylate, cyciohexyl methacrylate, neopentyl methacrylate, isobornyl methacrylate, 3,3,5-trimethylcyclohexyl methacrylate and stearyl methacrylate.

As monomers c), for example styrene, vinyltoluene and β-ethylstyrene may be considered.

Examples for d) are acrylic and methacrylie acid, which are also preferably used, such as also crotonic acid, itaconic acid, fumaric acid, maleic acid and citraconic acid.

The production of the copolymers-can be effected by means of copolymerisation of the monomers a) to d) given by way of example, according to normal radical polymerisation methods, such as for example solution, emulsion, bead or mass polymerisation. The monomers are thereby copolymerised at temperatures from 60 to 160° C., preferably 80 to 150° C., in the presence of radical formers and if necessary molecular weight regulators.

The production of carboxyl-functional acrylate copolymers results in inert solvents. Suitable solvents are for example aromatics, such as benzene, toluene, xylene; esters, such as ethyl acetate, butyl acetate, hexyl acetate, heptyl acetate, methyl glycol acetate, ethyl glycol acetate, methoxypropyl acetate; ethers, such as tetrahydrofuran, dioxan, diethylene glycoldimethyl ether; ketones, such as acetone, methyl ethyl ketone, methyl isobutyl ketone, methyl-n-amyl ketone, methyl isoamyl ketone or any mixtures of such solvents.

The production of copolymers can be effected continuously or intermittently. Normally, the monomer mixture and the initiator are metered uniformly and continuously into a polymerisation reactor and, at the same time, the corresponding quantity of polymer is continuously withdrawn. In this way, copolymers which are almost chemically uniform can be produced for preference. Almost chemically uniform copolymers can also be produced by allowing the reaction mixture to run into a stirring machine at a constant speed without withdrawing the polymer.

A part of the monomers can also be produced for example in solvents of the known type and the residual monomers and auxiliary aids can be introduced into this recipient separately or together.

In general, polymerisation takes place at atmospheric pressure but can also be performed at pressures of up to 25 bar. The initiators are used in quantities of 0.05 to 15% by weight relative to the total quantity of, monomers.

Suitable initiators are common radical starters, such as e.g. aliphatic azo compounds, such as azodiisobutyronitrile, azo-bis-2-methylvaleronitrile, 1,1'-azo-bis-1-cyclohexanenitrile and 2,2-azo-bis-isobutyric acid alkylester; symmetric diacyl peroxides, such as for example acetyl, propionyl or butyryl peroxide, benzoyl peroxides substituted with bromo-, nitro-, methyl- or methoxy groups, lauryl peroxides; symmetric peroxydicarbonates, for example tert-butyl perbenzoate, hydroperoxides, such as for example tert-butyl hydroperoxide, cumol hydroperoxide, dialkyl peroxides, such as dicumyl peroxide, tert-butylcumyl peroxide or di-tert-butyl peroxide.

In order to adjust the molecular weight of the copolymers, common regulators can be used during production. There may be mentioned by way of example mercaptopropionic acid, tert-dodecylmercaptan, n-dodecylmercaptan or diisopropylxanthogendisulphide.

The regulators can be-added in quantities of 0.1 to 10% by weight relative to the total quantity of monomers.

The solutions of copolymers occurring during copolymerisation can then be fed without further processing to the evaporation or degassing process in which the solvent is removed for example in an evaporation extruder or spray drier at approximately 120 to 160° C. and in a vacuum of 100 to 300 mbar and the copolymers to be used according to the invention are obtained.

The equivalent ratio of β-hydroxyalkylamide equivalents to carboxylic acid equivalents is within the range of 0.6 to 1.6:1.

Common pigments and/or fillers and/or additives can be used for the production of powder-coatings.

Of concern thereby are additives from the group of accelerators, flow control and degassing agents, heat-, UV- and/or HALS stabilisers and/or triboadditives and also if required matting agents, such as for example wax.

The production of powder coatings takes place preferably in a smeltery by communal extrusion of the entire formulation components at temperatures between 60 and 140° C. The extruded material is then cooled, ground and screened to a particle size of less than 90 μm. In principle, other methods are also suitable for producing powder coatings such as for example mixing of the formulation components in solution and subsequent precipitation or distillation removal of the solvents.

The application of the powder coatings according to the invention is effected according to methods which are commonly used for powder coatings, for example by means of electrostatic spray devices (Corona or Tribo) or according to the fluid bed method.

The flow is determined for coated metal sheets which have a film thickness of approximately 60 μm. As a basis for measurement, a gradation of 1–5 is used, 1 being the best flow and 5 the worst.

Degassing is determined for coated metal sheets which have a film thickness increasing from 30 to 200 μm. The film thickness, in which the first pinholes occur, serves as the degassing limit.

COMPARATIVE EXAMPLE 560.5 g Grilesta P 810 (carboxyl-functional copolyester of the UCB company (B), having an acid value of 33 [mg KOH/g] and a Tg of approximately 60° C.), 29.5 g Primid XL 552 (bis[N,N'-di(β-hydroxyethyl)]-adipamide of the EMS-Chemie AG company (OH)), 400 g Kronos CI 2160 (Ti02 of the Kronos company (D)), 8 g Resiflow PV 88 (flow control agent based on polyacrylate, commercial product of the Worleé-Chemie GmbH company), and 2 g benzoin are mixed dry in a Henschel mixer at 700 rpm for 30 seconds and then extruded on a Buss Co kneading machine (PLK 46) at a surface temperature of 100° C. with a cooled screw arid at a screw rotation of 150 rpm. The extruded material is cooled, ground and screened to less than 90 μm.

The powder coatings, are applied electrostatically (Corona or Tribo) to aluminium sheets (Q panel AL—36 5005H 14/08 (0.8 mm) and hardened in an electric oven for 15 minutes at a baking temperature of 180° C.

EXAMPLE 1

320 g (1 mol) bis[N,N'-di(β-hydroxyethyl)]-adipamide with a hydroxyl number of 700 mg KOH/g are melted at 130° C. 60 g acetic acid (100%) are dropped during agitation into the molten mass at 130° C. within an hour. After a reaction time of 30 minutes at 130° C., a vacuum of 300 mbar is applied at the same temperature and the resultant reaction water is withdrawn. The molten mass is cooled and then pulverised. The hydroxyl number of the product is 525 mg KOH/g.

EXAMPLE 2

554.6 g Grilesta P 810 (carboxyl-functional copolyester of the UCB company (B), having an acid value of 33 [g KOH/g] and a Tg of approximately 60° C.), 35.4 g of the product of Example 1, 400 g Kronos CI 2160 (Ti02 of the Kronos company (D)), 8 g Resiflow PV 88 (flow control agent based on polyacrylate, commercial product of the Worleé-Chemie GmbH company), and 2 g benzoin are mixed dry for 30 seconds in a Henschel mixer at 700 rpm and then extruded on a Buss Co kneading machine (PLK 46) at a surface temperature of 100° C. with a cooled screw and at a screw rotation of 150 rpm. The extruded material is cooled, ground and screened to less that 90 μm.

The powder coatings are applied electrostatically (Corona or Tribo) to aluminium sheets (Q panel AL-36 5005 H 14/08 (0.8 mm) and hardened in an electric oven for 15 minutes at a baking temperature of 180° C.

Table 1 demonstrates the powder coating properties.

TABLE 1

| | Gelling time (sec) according to DIN 55990 at 200° C. | Reverse impact (inch pound) according to ASTM D2794 | Flow scale 1–5 | Degassing limit (μm) |
|---|---|---|---|---|
| Comparative example | 90 | 160 | 3 | 80 |
| Example 2 | 155 | 160 | 1 | 120 |

What is claimed is:

1. Thermosetting coating material comprising
   (A) a carboxyl-functional polyester produced by a condensation reaction from aliphatic and/or cycloaliphatic polyols with aliphatic and/or cycloaliphatic and/or aromatic polycarboxylic acid and anhydrides, the polyester having a Tg in the range of 30° C. to 80° C. and an acid value of approximately 20 to 100 (mg KOH/g), and/or comprising a carboxyl-functional polyacrylate produced by polymensation of unsaturated compounds, the polyacrylate having an acid value of 20 to 300 (mg KOH/g), and
   (B) a β-hydroxyalkylamide which is defined by Formula I, Formula I

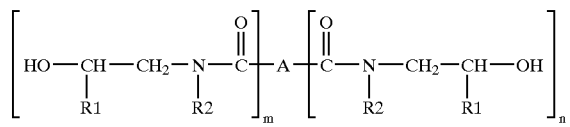

R1 being hydrogen or C1–C5 alkyl and R2 being

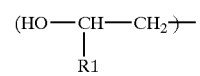

wherein R1 has the previously indicated meaning and that one or two OH groups are masked and A is a chemical bond or a monovalent or multivalent organic group derived from saturated, unsaturated or aromatic hydrocarbon groups including substituted hydrocarbon groups with 2 to 20 carbon atoms, m is 1 to 2, n is 0 to 2 and m+n is at least 2, the equivalent ratio of β-hydroxyalkylamide equivalents to carboxylic acid equivalents being within the range of 0.6 to 1.6:1.

2. Thermosetting coating material according to claim 1, wherein
   the OH group is masked by

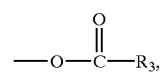

R3 being hydrogen, or a saturated or unsaturated aliphatic or cycloaliphatic or aromatic group with up to 60° C. atoms, which group can contain additional carboxyl groups or a polymer.

3. Thermosetting coating material according to claim 1, wherein the β-hydroxyalkylamides according to Formula II are bis[N,N'-di(β-hydroxyethyl)-adipamide]
bis[N,N'-di(β-hydroxypropyl)-adipamide].

4. Method for producing powder coatings, whereby an extruded material is produced in the smeltery by communal extrusion of the entire formulation components of the coating materials according to claim 1, and also additionally pigments and/or fillers and/or additives at temperatures between 60 and 140° C., said extruded material is then cooled, ground and screened to a particle size of <90 μm.

5. A protective layer comprising the coating materials of claim 1.

6. Thermosetting coating material according to claim 1, further comprising pigments and/or fillers and/or heat stabilisers and/or triboadditives and/or further additives.

7. Thermosetting coating material according to claim 6, wherein said further additives comprise flow control and/or degassing agents.

8. Thermosetting coating material according to claim 2, wherein said polymer comprises a polyester or a polyacrylate.

* * * * *